United States Patent
Lauderbaugh

(10) Patent No.: US 12,459,063 B2
(45) Date of Patent: Nov. 4, 2025

(54) DETACHABLE SUPPORT STRUCTURE FOR USE WITH MOBILE LIFT TABLE

(71) Applicant: Vehicle Service Group, LLC, Madison, IN (US)

(72) Inventor: Gerry Lauderbaugh, Dupont, IN (US)

(73) Assignee: Vehicle Service Group, LLC, Madison, IN (US)

(*) Notice: Subject to any disclaimer, the term of this patent is extended or adjusted under 35 U.S.C. 154(b) by 0 days.

(21) Appl. No.: 19/005,755

(22) Filed: Dec. 30, 2024

(65) Prior Publication Data

US 2025/0135589 A1    May 1, 2025

Related U.S. Application Data

(62) Division of application No. 18/502,299, filed on Nov. 6, 2023, now Pat. No. 12,186,842.

(60) Provisional application No. 63/422,648, filed on Nov. 4, 2022.

(51) Int. Cl.
| | | |
|---|---|---|
| *B23P 19/00* | (2006.01) | |
| *B23P 6/00* | (2006.01) | |
| *B60L 53/80* | (2019.01) | |

(52) U.S. Cl.
CPC .............. *B23P 19/008* (2013.01); *B23P 6/00* (2013.01); *B60L 53/80* (2019.02); *Y10T 29/49819* (2015.01)

(58) Field of Classification Search
CPC ..... B23P 19/008; B23P 6/00; Y10T 29/49819
See application file for complete search history.

(56) References Cited

U.S. PATENT DOCUMENTS

| | | | | |
|---|---|---|---|---|
| 5,383,411 A | * | 1/1995 | Tomaka | A47B 23/001 108/132 |
| 7,849,789 B1 | * | 12/2010 | Whelan | A22C 17/0013 108/174 |
| 8,822,885 B2 | * | 9/2014 | Daneshvar | A47C 7/748 219/217 |
| 2008/0060558 A1 | * | 3/2008 | Blood | B60P 3/36 108/18 |
| 2021/0164243 A1 | * | 6/2021 | Foley | E04G 1/32 |

* cited by examiner

*Primary Examiner* — Sarang Afzali
(74) *Attorney, Agent, or Firm* — Frost Brown Todd LLP

(57) ABSTRACT

An apparatus and method of use for supporting a fuel unit, the apparatus including: a frame including an attachment portion and a coupling portion, the attachment portion being configured to engage the fuel unit to thereby prevent lateral movement of the fuel unit relative to the frame, the coupling portion being configured to engage a lift table to thereby prevent lateral movement of the frame relative to the lift table; and a plurality of legs rotatably secured to the frame, each leg of the plurality of legs being configured to transition between an extended configuration and a retracted configuration, wherein the extended configuration is configured to allow a foot of a respective leg to contact a floor, wherein the retracted configuration is configured to prevent the foot of the respective leg from contacting the floor.

20 Claims, 14 Drawing Sheets

DETACHABLE SUPPORT STRUCTURE FOR USE WITH MOBILE LIFT TABLE

REFERENCE TO RELATED APPLICATIONS

This application is a divisional of U.S. application Ser. No. 18/502,299, filed Nov. 6, 2023, and issued as U.S. Pat. No. 12,186,842 on Jan. 7, 2025, entitled "Method of Receiving, Transporting, and Storing a Fuel Unit Using a Mobile Lift Table," which claims the benefit of U.S. Provisional Pat. App. No. 63/422,648, filed Nov. 4, 2022, entitled "Detachable Support Structure for Use with Mobile Lift Table," the disclosures of each of which are incorporated by reference herein.

BACKGROUND

In some instances, it may be desirable to remove an electrical vehicle ("EV") battery or a fuel cell (generically referred to herein as a "fuel unit") from a vehicle powered by such sources. For example, it may be desirable to remove a fuel unit from an EV for purposes of repair or replacement of the fuel unit or repair or maintenance of the EV. Further, it may be desirable to install a fuel unit onto an EV by suitably positioning the fuel unit adjacent to corresponding portions of the vehicle intended to receive and mount the fuel unit. Mobile lift tables may be used in both removing and installing fuel units. For example, a mobile lift table may be utilized to initially support a removed fuel unit once detached from the vehicle, and then transport the removed fuel unit to a desired location. Additionally, or alternatively, the mobile lift table may also be used to suitably elevate and position a fuel unit such that a technician may suitably position the fuel unit adjacent to corresponding mounting portions of the vehicle in order to install the fuel unit on the intended vehicle. Further additionally, or alternatively, the mobile lift table may be used to remove a fuel unit so technicians can access vehicle components that are difficult to access when the fuel unit is in place.

While a variety of movable lift tables have been made and used, it is believed that no one prior to the inventor(s) has made or used an invention as described herein.

BRIEF DESCRIPTION OF THE DRAWINGS

While the specification may conclude with claims that particularly point out and distinctly claim the invention, it is believed the present invention will be better understood from the following description of certain examples taken in conjunction with the accompanying drawings, in which like reference numerals identify the same elements and in which:

Figure 1A:
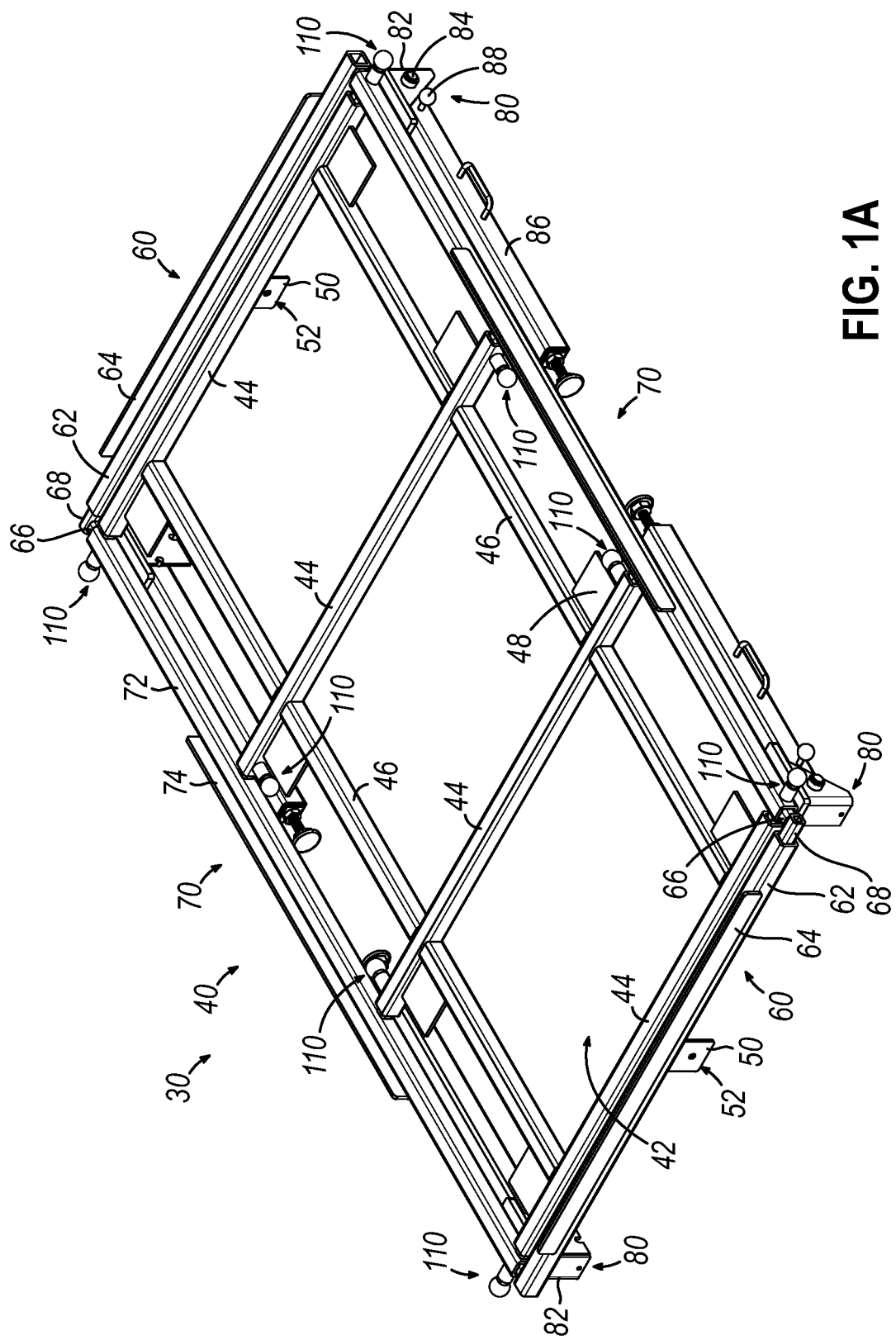
FIG. 1A is a top perspective view of a detachable support structure having an adjustable engagement frame assembly and a retractable leg assembly, with the adjustable engagement frame assembly in a restricted configuration and the retractable leg assembly in a retracted configuration.
Figure 1B:
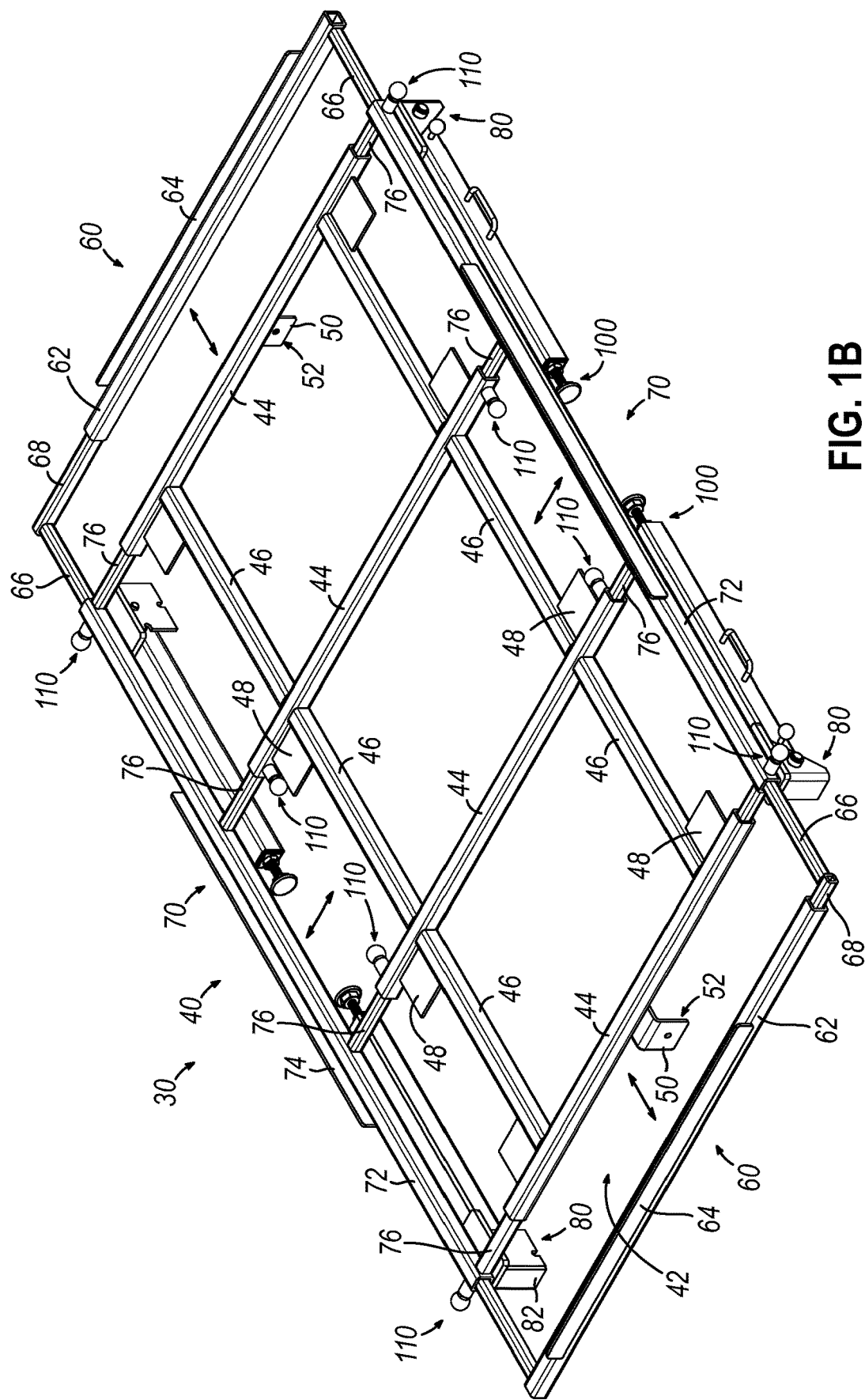
FIG. 1B is a top perspective view of the detachable support structure of FIG. 1A, with the adjustable engagement frame assembly in an expanded configuration and the retractable leg assembly in the retracted configuration.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the resent invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Illustrative Support Structure and Use of Mobile Lift Table

As mentioned above, in instances where an EV fuel unit is being removed from an electrical vehicle ("EV"), a lift table may be used to initially support a removed fuel unit detached from the vehicle, and then transport the removed fuel unit to a desired location. In some instances, it may be desirable to utilize a lift table for other purposes after a fuel unit has been suitably removed from an EV. Therefore, it may be desirable to remove a fuel unit from the lift table such that the lift table may be utilized elsewhere. Additionally, after a fuel unit has been suitably removed from the lift table, it may be desirable to easily access various sections of the removed fuel unit for various purposes, such as maintenance of the fuel unit. In some instances, it may be desirable to re-engage a removed fuel unit with a lift table, such that a lift table may once again suitably transport, lift, and position the re-engaged fuel unit.

Fuel units may come in various dimensions, such that the engagement area of a particular lift table may be suitable for a first fuel unit, but more difficult to use to accommodate a second, larger, fuel unit. Further, fuel units may be heavy and difficult to lift off a lift table for purposes of removing the fuel unit from the lift table. Additionally, fuel units removed from an EV may be difficult to lift off a ground surface to place back onto a lift table. Therefore, it may be desirable to have a detachable support structure configured to selectively couple with a lift table to cooperatively engage an EV fuel unit. Further, it may be desirable for the detachable support structure to easily decouple from the lift table such that the detachable support structure may (A) provide for easy removal of the EV fuel unit from the lift table, (B) further support the removed EV fuel unit while providing access to various components of the removed EV fuel unit, and (C) keep the EV fuel unit positioned for easy re-engagement with a lift table. Still further, all embodiments discussed herein and all actions described in relation to removal, movement, and transportation of fuel units may be applied equally and analogously to engines, engine components, transmissions, or other vehicle parts.

FIGS. 1A-2B show an illustrative detachable support structure (30). Detachable support structure (30) includes an adjustable engagement frame assembly (40) and four adjustable leg assemblies (80). As will be described in greater detail below, detachable support structure (30) is configured to selectively couple and decouple with a lift table (10) (see FIGS. 3A-3F), assist lift table (10) with suitably engaging and supporting fuel units of various sizes, provide lift table (10) with an easy means for unloading and re-engaging fuel units, structurally support fuel units without the assistance of lift table (10), and provide technicians with easy access to a fuel unit removed from both an EV and lift table (10).

A. Illustrative Adjustable Engagement Frame Assembly

Adjustable engagement frame assembly (40) includes a stationary internal frame (42), two adjustable end sections (60), two adjustable side sections (70), and a plurality of position assemblies (110) configured to indicate proper positioning of adjustable sections (60, 70) and/or inhibit undesirable movement of adjustable sections (60, 70) relative to stationary frame (42) during exemplary use in accordance with the description herein. Engagement frame assembly (40) is capable of suitably engaging and supporting a fuel unit (FU) in accordance with the description herein.

Stationary internal frame (42) includes a plurality of laterally hollow frame sections (44), a plurality of longitudinal frame sections (46), support gussets (48) attached to respective frame sections (44, 46), and two downwardly presented tabs (50) extending downward from a respective hollow frame section (44). Frame sections (44, 46) are fixedly attached to each other. Frame sections (44, 46) are dimensioned to rest on top of tabletop assembly (16) (see FIGS. 3A-3B) while coupled to mobile lift table (10). Frame section (44, 46) may transmit the load of a supported fuel unit (FU) onto mobile lift table (10) during exemplary use in accordance with the description herein.

Frame sections (44, 46) may be attached to each other using any suitable means as would be apparent to one skilled in the art in view of the teachings herein. For example, frame sections (44, 46) may be attached to each other via welding. In some embodiments, support gussets (48) are attached to respective frame sections (44, 46) to bolster the rigidity of stationary internal frame (42).

Downwardly presented tabs (50) each define a through hole (52). As best shown between FIGS. 3A-3B, downwardly presented tabs (50) are designed to be housed within a slot (25) defined by brackets (26) of tabletop assembly (16) of mobile lift table (10). Each bracket (26) also defines a corresponding through hole (28). Through holes (28, 52) are dimensioned to align with each other when engagement frame assembly (40) rests on top of mobile lift table (10) in accordance with the description herein. While through holes (28, 52) are aligned with each other, a coupling pin (32) may be inserted into through holes (28, 52), thereby inhibiting relative movement between downwardly presented tabs (50) and their respective bracket (26). When both coupling pins (32) are attached to their respective tabs (50) and brackets (26), stationary internal frame (42) may be substantially fixed relative to tabletop assembly (16) of lift table (10). Therefore, a technician may couple detachable support structure (30) with mobile lift table (10) by utilizing coupling pins (32), brackets (26), and tabs (50).

While coupling pins (32), brackets (26), and tabs (50) are used in the current example, any other suitable means may be utilized to suitably couple support structure (30) with lift table (10). For example, longitudinal frame sections (46) and/or support gussets (48) may be dimensioned to engage suitable side surfaces of tabletop assembly (16) such that while stationary internal frame (42) rests on tabletop assembly (16), longitudinal frame sections (46) and/or support gussets (48) inhibit rotational movement of support structure (30) about a vertical axis.

As will be described in greater detail below, adjustable end sections (60) can actuate relative to stationary internal frame (42) in order to change the overall length of engagement frame assembly (40), while adjustable side sections (70) can actuate relative to stational internal frame (42) in order to change the overall width of engagement frame assembly (40). Turning back to FIGS. 1A-1B, hollow frame sections (44) each define at least one internal channel that is dimensioned to slidably receive a respective lateral adjustment bar (76) of adjustable side sections (70). Therefore, hollow frame sections (44) and respective lateral adjustment bars (76) have a telescoping relationship in order to provide for an adjustable relationship between adjustable side sections (70) and stationary internal frame (42).

Adjustable end sections (60) include a hollow frame section (62), a retainment tab (64), a pair of longitudinal bars (66), and a lateral bar (68). Retainment tab (64) is fixed to, and extends upwardly from, hollow frame section (62). Retainment tab (64) is configured to engage a side portion of a suitable fuel unit (FU) in order to retain fuel unit (FU) being supported by detachable support structure (30) in accordance with the description herein.

Longitudinal bars (66) are slidably housed within a channel of hollow frame section (72) of a respective adjustable side section (70). Therefore, hollow frame sections (72) and longitudinal bars (66) have a telescoping relationship in order to allow adjustable end sections (60) to longitudinally actuate relative to the rest of frame assembly (40), thereby changing the overall length of frame assembly (40).

Hollow frame section (62) defines a channel dimensioned to slidably house lateral bar (68). Additionally, one longitudinal bar (66) is fixed to an end of hollow frame section (62), while a second longitudinal bar (66) is fixed to an end of lateral bar (68). The sliding relationship between hollow frame section (62) and lateral bar (68) allows adjustable end sections (60) to remain operatively engaged with adjustable side sections (70) in response to lateral movement of adjustable side sections (70) in accordance with the description herein.

Adjustable side section (70) includes a hollow frame section (72), a retainment tab (74), and a plurality of lateral bars (76). As mentioned above, hollow frame sections (72) define at least one channel dimensioned to slidably house longitudinal bars (66) of adjustable end sections (60).

As also mentioned above, lateral bars (76) are slidably received within hollow frame sections (44) of stationary internal frame (42), thereby providing an adjustable relationship between adjustable side sections (70) and stationary internal frame (42). Lateral bars (76) are fixed to their respective hollow frame sections (72). Lateral bars (76) may be fixed to hollow frame sections (72) using any suitable means as would be apparent to one skilled in the art in view of the teachings herein.

Therefore, if a technician desires to change the longitudinal length and/or the lateral length of adjustable engagement frame assembly (40), the technician may push or pull on a respective adjustable end section (60) or adjustable side section (70) in order to actuate the respective adjustable sections (60, 70) relative to stationary internal frame (40). The adjustable nature of side sections (70) and end sections (60) may allow a technician to change the overall dimensions of engagement frame assembly (40) to accommodate a specific fuel unit (FU). If desired, a technician may adjust the dimensions of frame assembly (40) such that retainment tabs (64, 74) suitably engage the perimeter of a specific fuel unit (FU).

Figure 4B:
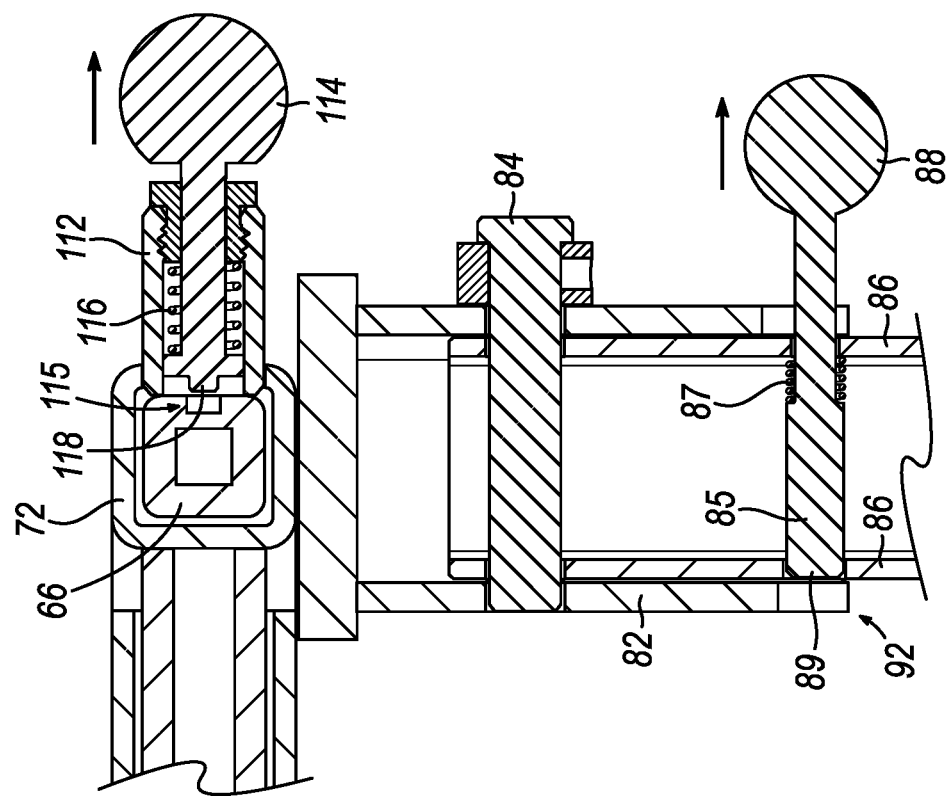
FIG. 4B is a cross-sectional view of the position assembly of the detachable support structure of FIG. 4A, where the actuating body of the position assembly and the locking device of the retractable leg assembly of FIG. 1A are suitably housed within corresponding recesses.
Figure 4A:
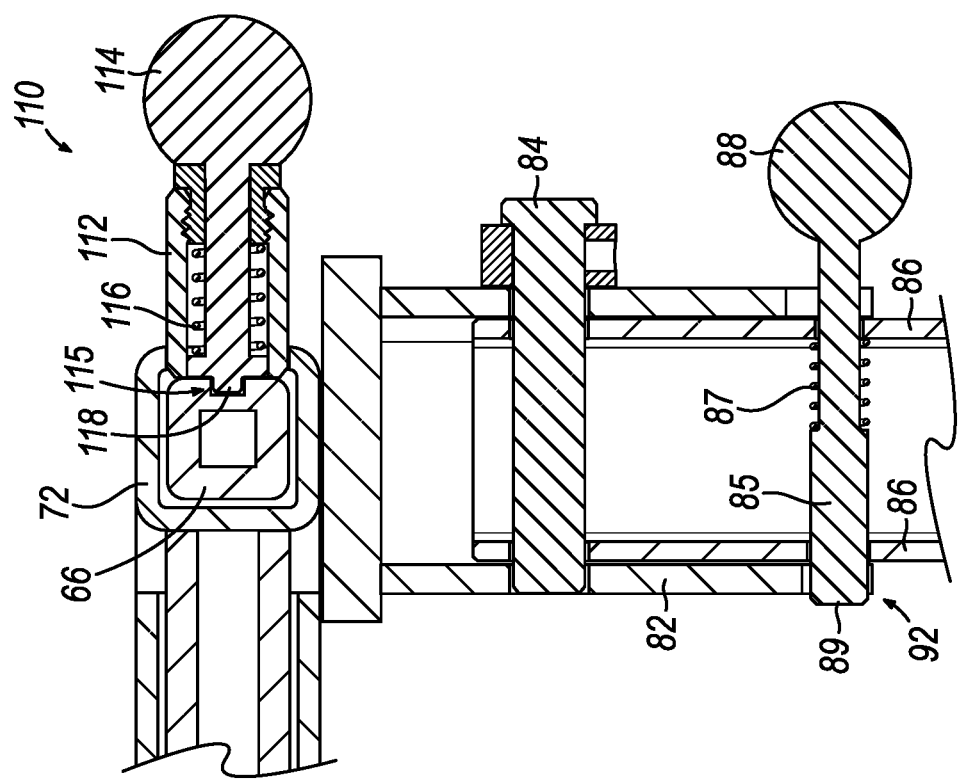
FIG. 4A is a cross-sectional view of a position assembly of the detachable support structure of FIG. 1A, where an actuating body of the position assembly and a locking device of the retractable leg assembly of FIG. 1A are not suitably housed within corresponding recesses.

In some instances, it may be desirable to indicate when adjustable sections (60, 70) reach a desired position associated with frame assembly (40) accommodating a specific fuel unit (FU). Additionally, or alternatively, it may be desirable to inhibit adjustable sections (60, 70) from inadvertently actuating relative to frame assembly (40) once sections (60, 70) are in a desired position. As mentioned above, frame assembly (40) includes a plurality of position assemblies (110) that are configured to indicate proper positioning of adjustable sections (60, 90) and/or inhibit undesirable movement of adjustable sections (60, 70) relative to stationary frame (43) during exemplary use in accordance with the description herein. FIGS. 4A-4B show position assembly (110) associated with frame section (72) and longitudinal bar (66) in order to operate with adjustable end section (60). It should be understood that position assemblies (110) associated with frame section (44) and lateral bars (76) may be substantially similar to position assemblies (110) associated with frame section (72) and longitudinal bars (66) but configured to operate with adjustable side sections (70).

In the current aspect of the disclosure, position assembly (110) includes a sleeve (112) extending outwardly from a respective frame section (72); actuating body (114) housed within, but configured to move relative to, sleeve (112); a bias spring (116) housed within sleeve (112) and in operative engagement with actuating body (114); and a longitudinal array of recesses (115) defined by bar (66). Each recess (115) is dimensioned to house a terminating end (118) of body (114). Terminating end (118) of body (114) is biased toward bar (66). Recesses (115) are prepositioned on bar (66) such that when terminating end (118) is biased within a recess (115), as shown in FIG. 4A, adjustable section (60) is in a predetermined position dimensioned to receive a specifically sized fuel unit (FU). The spring-biased nature of body (114) interacting with a recess (115) may provide at least some degree of resistance inhibiting relative movement between bar (66) and frame section (72) once a predetermined position has been achieved.

As shown in FIG. 4B, actuating body (114) may be driven such that terminating end (118) is not suitably housed within a corresponding recess (115). Actuating body (114) may be driven to the position shown in FIG. 4B by a technician providing a sufficient force on adjustable section (60). Once adjustable section (60) reaches another predetermined position where terminating end (118) is aligned with a specific recess (115), spring (116) may drive terminating end (118) into the aligned recess (115), which may provide tactile and/or audible feedback to the technician that adjustable section (60) has reached another predetermined position associated with a specifically sized fuel unit (FU). Therefore, position assemblies (110) may assist a technician by inhibiting accidental movement of adjustable sections (60, 70) away from desired positions while also providing some indication that adjustable sections (60, 70) achieved predetermined positions associated with specifically sized fuel units (FU).

While position assemblies (110) are shown with spring-biased actuating body (114) that engages an array of recesses (115), it should be understood that any other suitable structures and means may be utilized to determine proper positioning of adjustable sections (60, 70) and to inhibit inadvertent movement of adjustable sections (60, 70). In some instances, rods (76, 66) and/or respective hollow frame sections (44, 72) may include visual indication features configured to indicate to a technician that a predetermined position suitable for accommodating a specific fuel unit (FU) has been reached. In such instances, position assemblies (110) may include a manual locking feature, where a technician can manually adjust whether or not adjustable sections (60, 70) are configured to move relative to internal frame (42). For example, actuating body (114) may be threadably attached to sleeve (112) such that a technician may rotate actuating body (114) to frictionally engage bar (66) after visually confirming proper location of adjustable section (60). For example, rods (76, 66) may be marked with visual indicators that visually display when rods (76, 66) achieve a position relative to frame sections (44, 72) suitable to engage a fuel unit (FU) of a specific size or type. Of course, position assemblies (110) may include any other suitable structures to locate proper positioning and inhibit movement away from such proper positioning as would be apparent to one skilled in the art in view of the teaching herein.

Frame assembly (40) defines various openings, such as the rectangular openings defined by adjacent frame sections (44, 46). In some aspects of the disclosure, such openings may provide for access to the underside of a fuel unit (FU) supported by support structure (30) in accordance with the description herein. In some aspects of the disclosure, support structure (30) may come with multiple panels that may cover the various openings. In some aspects of the disclosure, multiple panels may be capable of being used alone or together in order to cover the various sizes of windows formed due to the adjustable nature of frame assembly (40).

Figure 5:
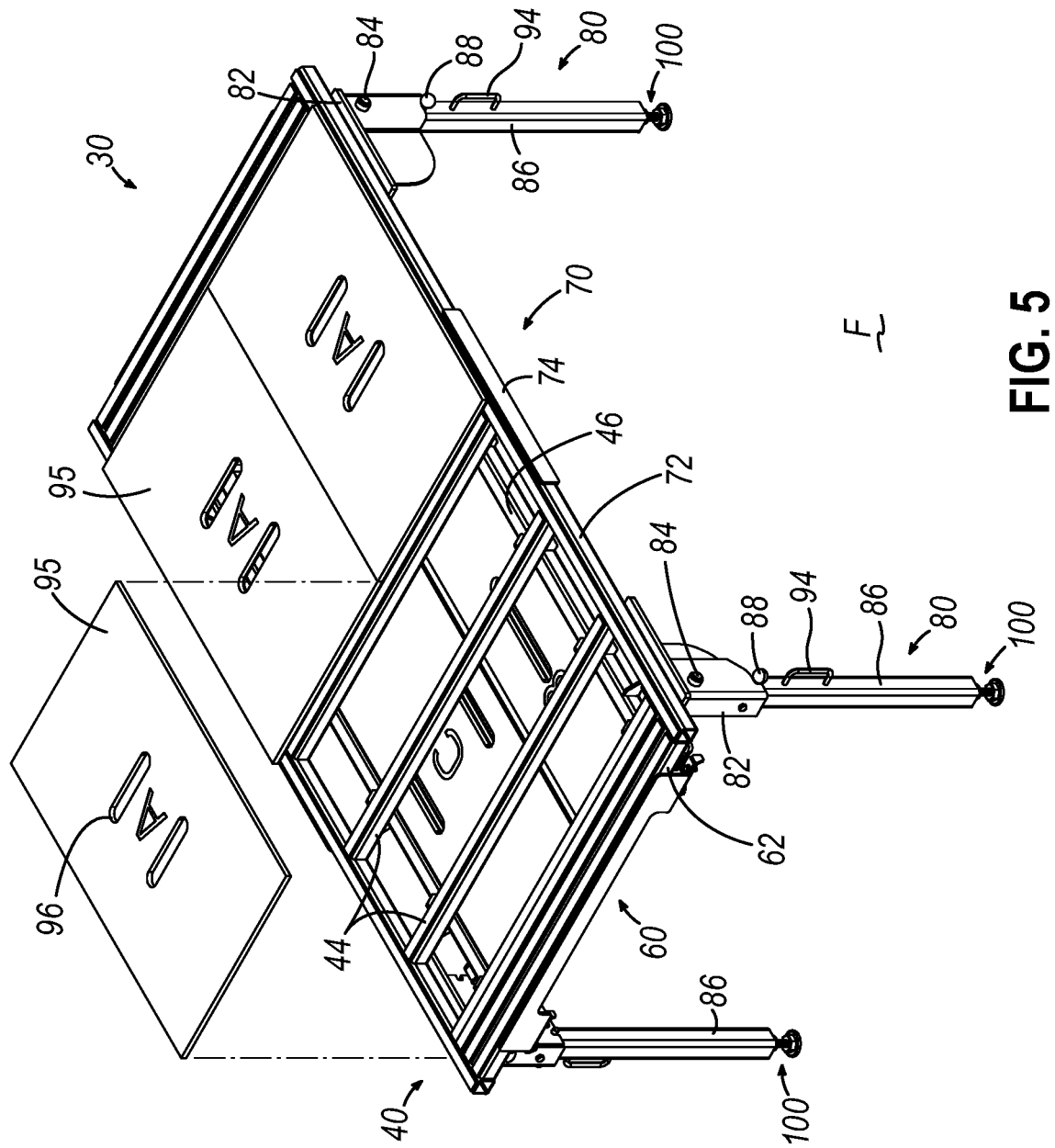
FIG. 5 is a top perspective view of removable panels positioned along the detachable support structure of FIG. 1A.

As shown in FIG. 5, support structure (30) may include panels (95) that may be positioned on top of support structure (30) and supported by frame sections (40, 44, 46, 62, 72) and longitudinal and lateral bars (66, 68, 76) or any other suitable portion of frame assembly (40) apparent to those skilled in the art in view of the teachings herein. Each panel (95) defines an opening or slot (96). Openings (96) may provide access to components of a supported fuel unit (FU). As one illustrative example, openings (96) may allow a technician to fix components of a supported fuel unit (FU) to top surface (15) of tabletop assembly (16) via openings (96). Openings (96) may also be used for handling and lifting panel (95) away from support structure (30) such as when an operator removes panel (95) from support structure (30). As shown, panels may be square, trapezoidal, or shaped in any other manner reasonable to overlay support structure (30). Further, in some embodiments, some or all openings (96) or other apertures in panels (95) align with one or more fixturing holes (not shown) in support structure (30), accepting attachments that pass through both the aperture/opening (96) and fixturing hole to position the attachment for a particular desired use whether or not the panel (95) is positioned on the support structure (30).

Figure 6:
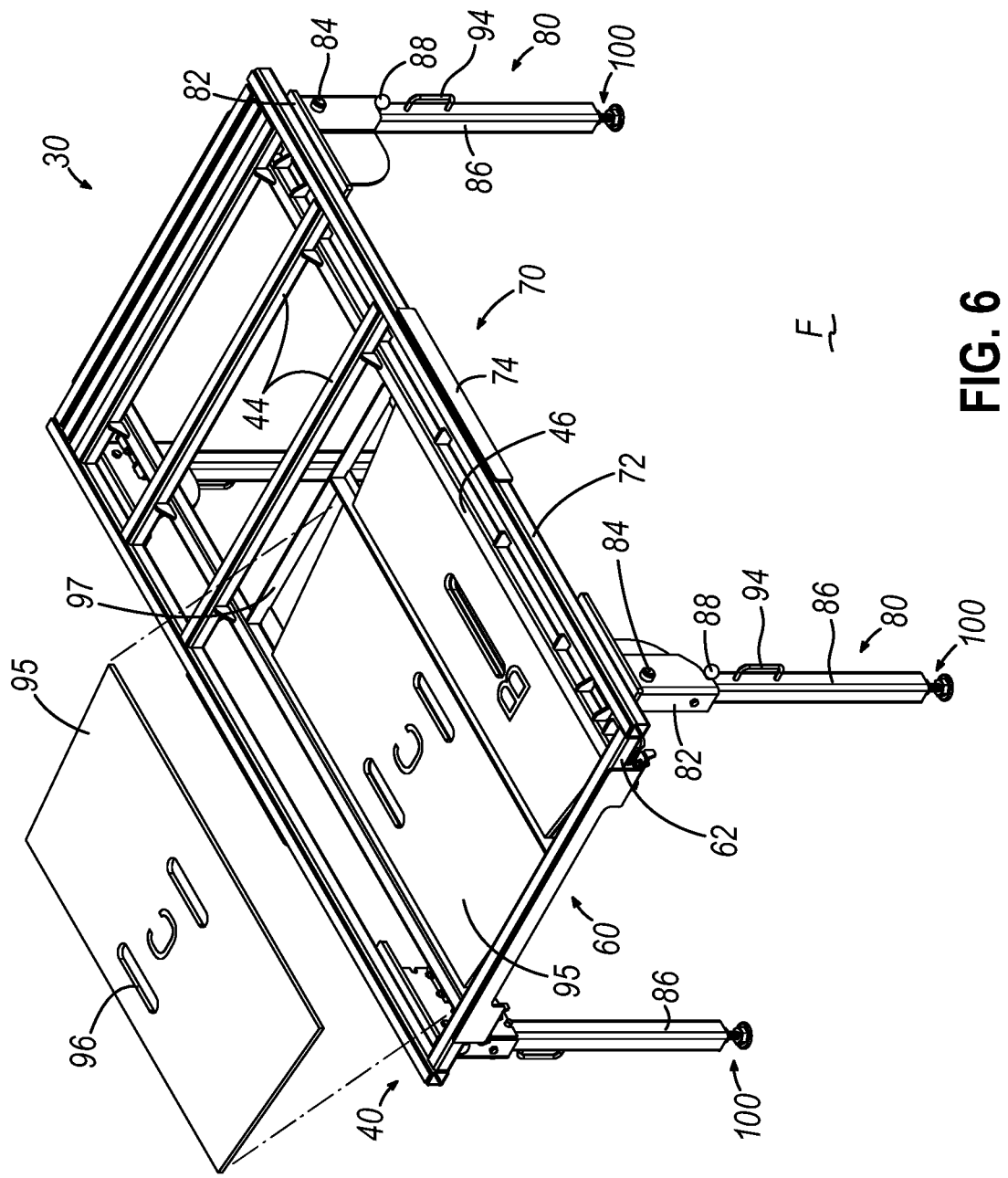
FIG. 6 is a bottom perspective view of the removable panels of FIG. 5 being stored underneath a portion of the detachable support structure of FIG. 1A.

As shown in FIG. 6, when not in use or on top of support structure (30), panels (95) may be stored on a bottom side of support structure (30) such that remaining portions of engagement frame assembly (40) are exposed or when extendable portions of support structure (30) are retracted. Bottom side of support structure (30) may include additional bracing configured for the storage of panels (95). When stored, panels (95) may be slid into support structure (30) in either an adjacent fashion, completely overlapping (stacked, as shown), or a partially overlapping orientation. As shown, four panels (95) may be used on top of support structure (30). Depending on the size of panel (95) and the extended or retracted configuration of support structure (30), more or fewer panels (95) may be used with support structure (30). Support structure (30) may be configured to thus allow storage of panels (95) by adding supporting cross-members configured to allow the placement and removal of panels (95). Panels (95) may be positioned and removed from storage independent of the position, width, or length of support structure (30). When stored, panels (95) may be confined or locked in place by adjustable end sections (60) and/or adjustable side section (70). Panels (95) may have various sizes as would be apparent to one skilled in the art in view of the teachings herein.

B. Illustrative Adjustable Leg Assembly

As mentioned above, detachable support structure (30) is configured to provide lift table (10) with an easy means for unloading and re-engaging fuel units, structurally supporting fuel units without the assistance of lift table (10) and providing technicians with easy access to a fuel unit removed from both an EV and lift table (10). As will be described in greater detail below, adjustable leg assemblies (80) are capable of assisting such functionality. Additionally, as will be described in greater detail below, leg assemblies (80) are configured to actuate between a retracted position and a downward position.

Figure 2A:
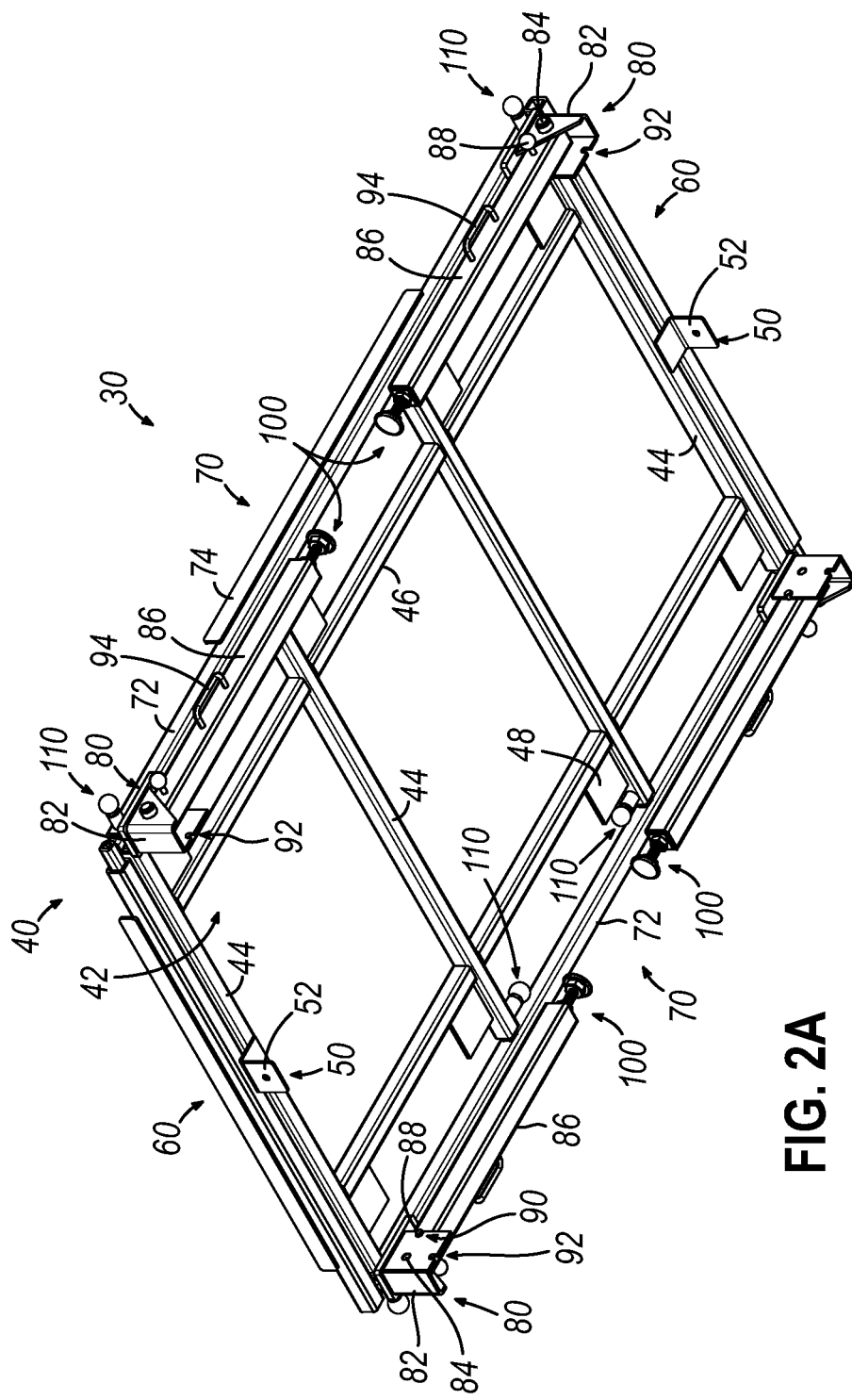
FIG. 2A is a bottom perspective view of the detachable support structure of FIG. 1A, with the adjustable engagement frame assembly in the restricted configuration and the retractable leg assembly in the retracted configuration.
Figure 2B:
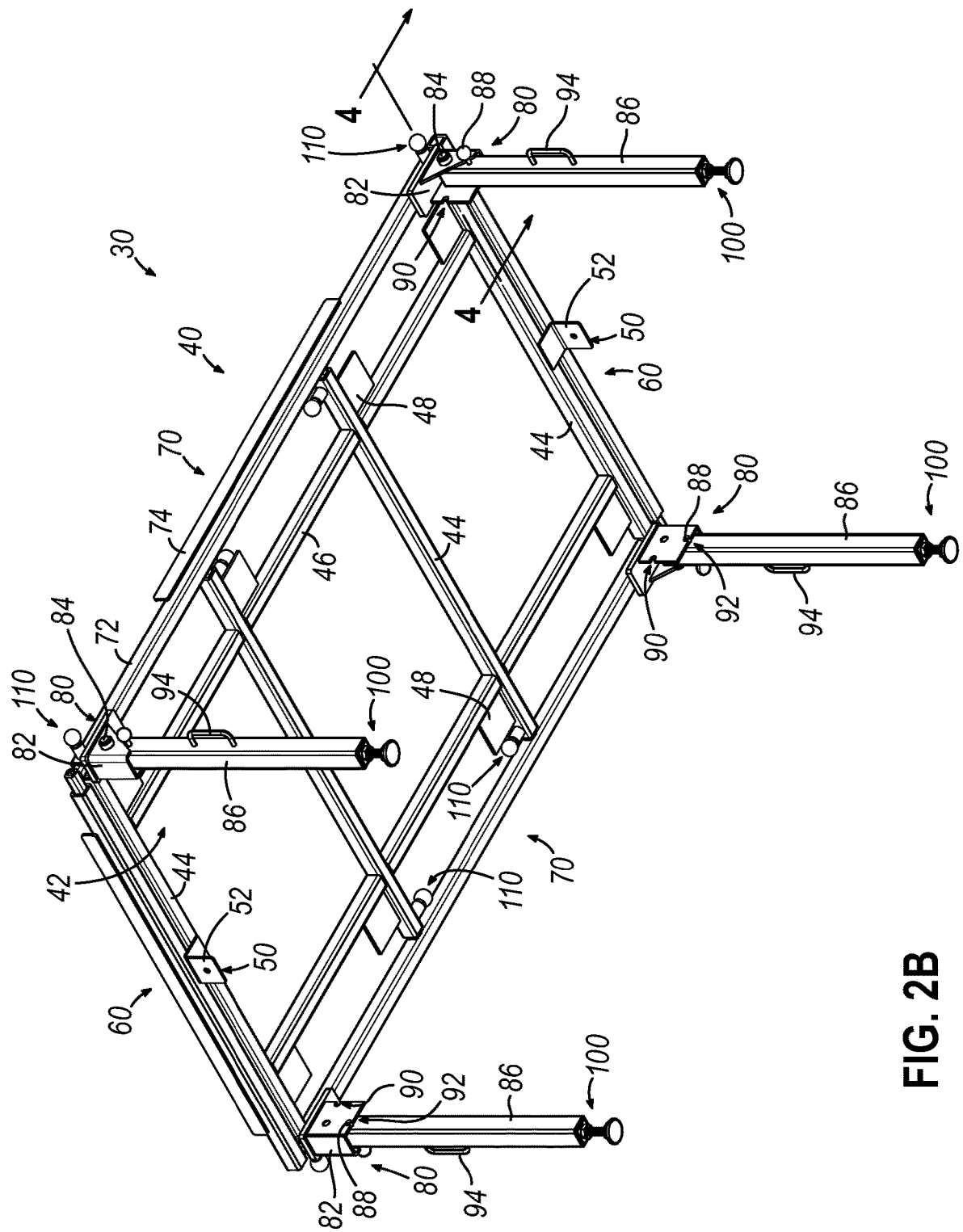
FIG. 2B is a bottom perspective view of the detachable support structure of FIG. 1A, with the adjustable engagement frame assembly in the restricted configuration and the retractable leg assembly in a downward configuration.

Turning to FIGS. 2A-2B, each leg assembly (80) includes a mounting frame (82), a pivoting leg (86) attached to mounting frame (82) via a pivot (84), a locking device (88), a handle (94) attached to pivoting leg (86), and an adjustable leveling pad (100) associated with pivoting leg (86). Mounting frame (82) is fixedly attached to adjustable engagement frame assembly (40). In the current example, each mounting frame (82) is attached to a terminating end of a respective frame section (72) of adjustable side sections (70). However, mounting frame (82) may be suitably attached to any suitable portion of engagement frame assembly (40) as would be apparent to one skilled in the art in view of the teachings herein. In one aspect of the disclosure, mounting frames (82) may be attached to corners of adjustable end sections (60). In another aspect of the disclosure, mounting frames (82) may be attached to portions of internal frame (42) that do not inhibit internal frame (42) from suitably resting on top of mobile lift (10) in accordance with the description herein.

Each mounting frame (82) defines a channel that pivotally houses pivoting leg (86). As mentioned above, pivoting leg (86) is pivotally attached to mounting frame (82) via a pivot (84). Pivoting leg (86) is configured to pivot between a retracted position (shown in FIG. 2A) and a downward position (shown in FIG. 2B). Pivoting legs (86) may be in the retracted position when legs (86) are not desired during exemplary use in accordance with the description herein. Alternatively, pivoting legs (86) may be selectively pivoted into the downward position when legs (86) are needed to support the rest of support structure (30) during illustrative use in accordance with the description herein. Therefore, a technician has the option of storing pivoting legs (86) in the retracted position or exposing pivoting legs in the downward position, depending on whether the use of legs (86) is desired. Allowing legs (86) to access a retracted position may save space around support structure (30) during exemplary use.

Locking device (88) is configured to selectively lock pivoting leg (86) in either the retracted position or the downward position. Turning to FIGS. 4A-4B, in the current aspect of the disclosure, locking device (88) includes a spring-biased pin (85) that is slidably disposed within pivoting leg (86) along a lateral path and biased via spring (87) laterally inward toward stationary internal frame (42). Each mounting frame (82) includes an internal plate that defines an upward locking slot (90) (see FIGS. 2A-2B) and a downward locking slot (92). As shown in FIG. 4A, spring-biased pin (85) of locking device (88) is biased such that a terminating end (89) of locking device (88) is configured to be housed within a respective locking slot (90, 92), depending on the pivotal position of leg (86). When terminating end (89) of locking device (88) is housed within a respective locking slot (90, 92), leg (86) is inhibited from pivoting about pivot (84) relative to mounting frame (82).

As shown in FIG. 4B, if a technician desires to move leg (86) between the retracted position and the downward position, the technician may pull locking device (88) laterally away from stationary internal frame (42), thereby overcoming the biasing force of spring (87) such that terminating end (89) of spring-biased pin (85) is no longer housed within a respective locking slot (90, 92). With terminating end (89) of spring-biased pin (85) removed from the respective locking slot (90, 92), the technician may pivot leg (86) toward the desired position (e.g., from the retracted position toward the downward position or from the downward position toward the retracted position). After moving leg (86) away from its original position, the technician may release locking device (88). Once leg (86) reaches its intended position, the biased nature of pin (85) may ensure terminating end (89) of pin (85) suitably engages the new locking slot (90, 92), thereby locking leg (86) in its newly achieved position.

Leg (86) includes a handle (94) that may be utilized by the technician to actuate leg (86) between the retracted position and the downward position in accordance with the description herein. It should be understood that while in the current aspect of the disclosure, legs (86) are pivotable between the retracted position and the downward position, legs (86) may actuate between such positions using any other suitable means as would be apparent to one skilled in the art in view of the teachings herein.

In some instances, the floor that legs (86) are configured to engage may not be suitably level such that only a portion of legs (86) suitably engage the floor while supporting structure (30) in accordance with the description herein. Adjustable leveling pads (100) allow a technician to individually adjust the length of legs (86) so that each leg (86) suitably engages the floor. In the current aspect of the disclosure, leveling pads (100) include a threaded rod that meshes with a female threading defined by a portion of leg (86). A technician may rotate the threaded rod relative to leg (86) utilizing corresponding nuts in order to adjust the length that the threaded rod extends from leg (86). Therefore, adjustable leveling pads (100) allow a technician to control the length of each leg (86) in order to suitably engage the floor.

It should also be understood that while a threaded rod is utilized in the current aspect of the disclosure in order to adjust the length of legs (86), adjustable leveling pads (100) may have any other suitable structure as would be apparent to one skilled in the art in view of the teachings herein.

C. Illustrative Use of Support Structure with Mobile Lift Table to Receive, Transport, and Store an EV Fuel Unit FIGS. 3A-3G show an illustrative use of support structure (30) in conjunction with mobile lift table (10) to receive, transport, and store an exemplary EV fuel unit (FU). In the current aspect of the disclosure, mobile lift table (10) includes a base (12), a scissor lift assembly (14), a tabletop assembly (16), castor wheels (18) attached to base (12), and a control assembly (20) including a handlebar (22) and foot pedal (24). Tabletop assembly (16) includes top surface (15) configured to engage stationary internal frame (42) described above. Additionally, tabletop assembly (16) includes brackets (26) as described above.

A technician may move mobile lift table (10) around a shop or other facility by using handlebar (22) to actuate lift table (10) on castor wheels (18). Scissor lift assembly (14) is suitably interposed between base (12) and tabletop assembly (16). Scissor lift assembly (14) is configured to actuate tabletop assembly (16) relative to base (12) between a lowered position (see FIG. 3F), a raised position (see FIGS. 3A-3C), and a plurality of positions between (see FIGS. 3D-3E). In the current aspect of the disclosure, scissor lift assembly (14) may be activated using foot pedal (24). While scissor lift assembly (14) and foot pedal (24) are used in the current aspect of the disclosure in order to raise and lower tabletop assembly (16), any other suitable structures and mechanisms may be utilized as would be apparent to one skilled in the art in view of the teachings herein.

Figure 3A:
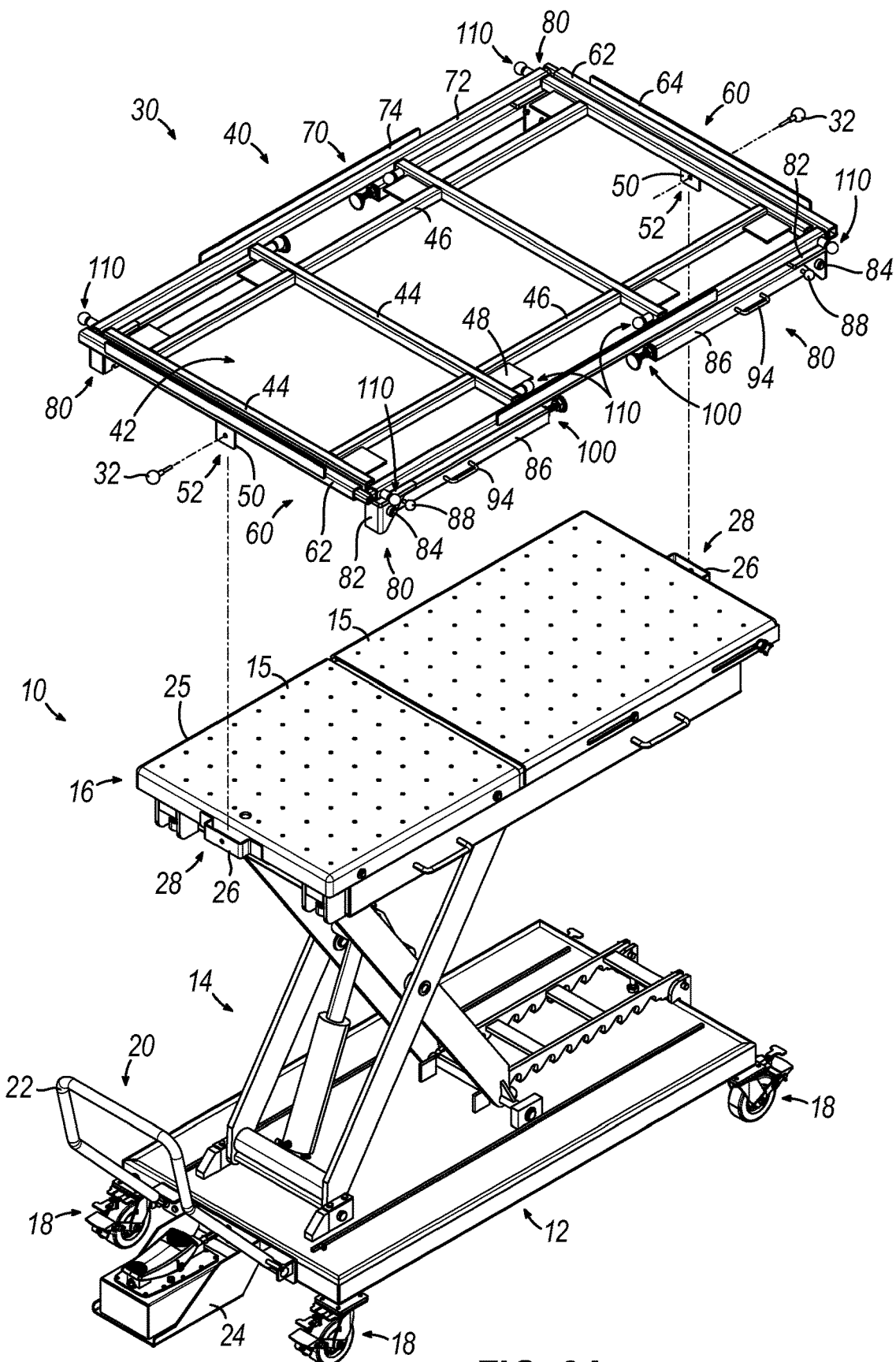
FIG. 3A is a top perspective view of the detachable support structure of FIG. 1A elevated above and aligned with a lift table in a raised configuration, where the retractable leg assembly of FIG. 1A is in the retracted configuration.

First, as shown in FIG. 3A, a technician may elevate support structure (30) over tabletop assembly (16) such that downwardly presented tabs (50) are suitably aligned with respective slots (25) as defined by brackets (26). In the current aspect of the disclosure, legs (86) are locked in the retracted position in accordance with the description herein.

Figure 3B:
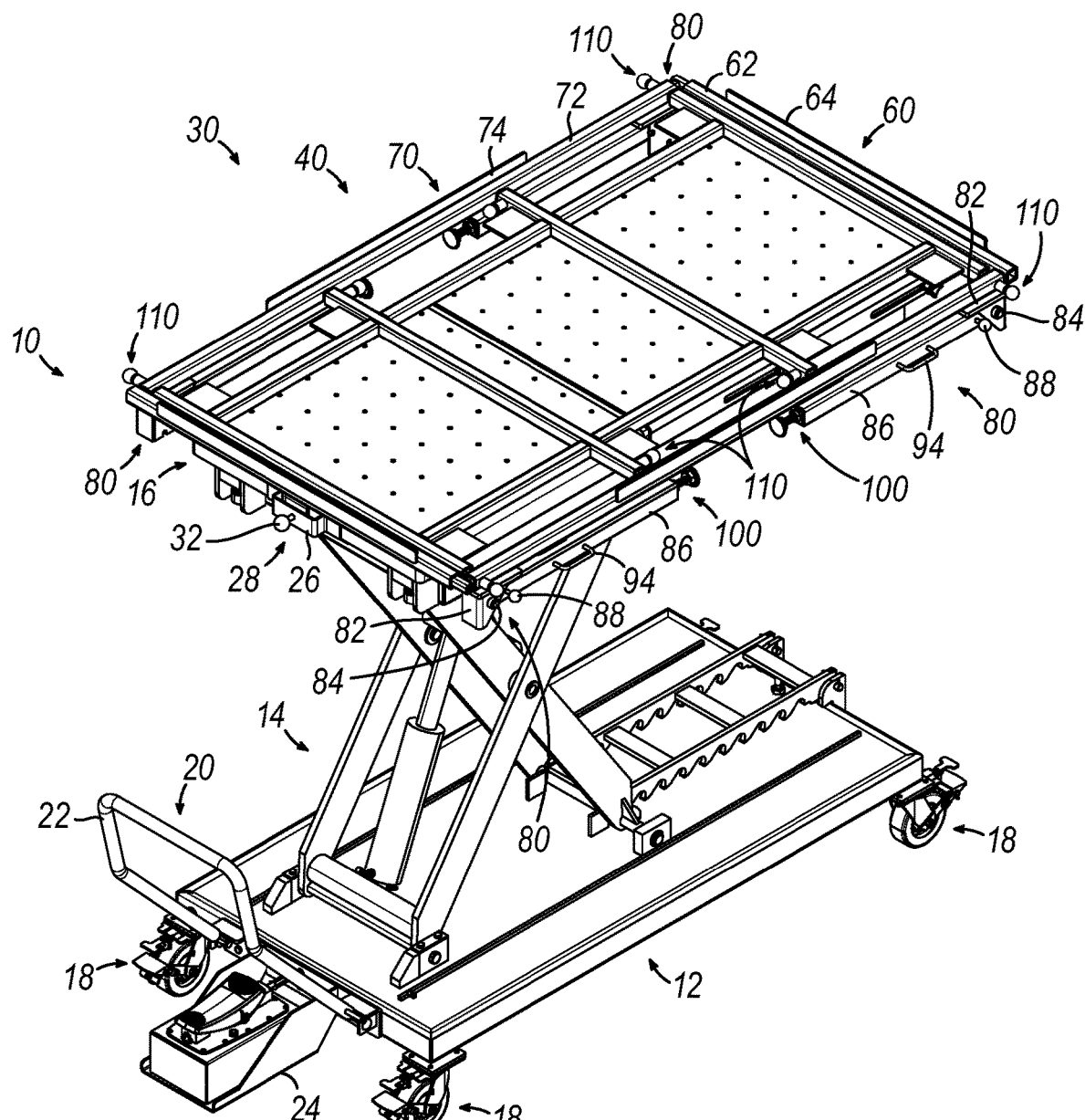
FIG. 3B is a top perspective view of the detachable support structure of FIG. 1A operatively attached with the lift table of FIG. 3A in a raised configuration, where the retractable leg assembly of FIG. 1A is in the retracted configuration.

Next, as shown in FIG. 3B, a technician may then lower support structure (30) such that internal frame (42) rests on top of table surfaces (15) and such that downwardly presented tabs (50) are housed within slots (25) defined by brackets (26). As mentioned above, brackets (26) and tabs (50) each define a coupling hole (28, 52) that are suitably aligned when internal frame (42) rests on top of table surfaces (15). Therefore, as also shown in FIG. 3B, a technician may insert coupling pin (32) into coupling holes (28, 52) to thereby substantially fix support structure (30) with tabletop assembly (16). It should be understood that, at the moment shown in FIG. 3B, actuation of tabletop assembly (16) also drives actuation of support structure (30). During the moment shown in FIG. 3B, a technician may also adjust the dimensions of adjustable frame assembly (40) in accordance with description herein to thereby accommodate the specific fuel unit that support structure (30) and mobile lift table (10) are about to receive.

Figure 3C:
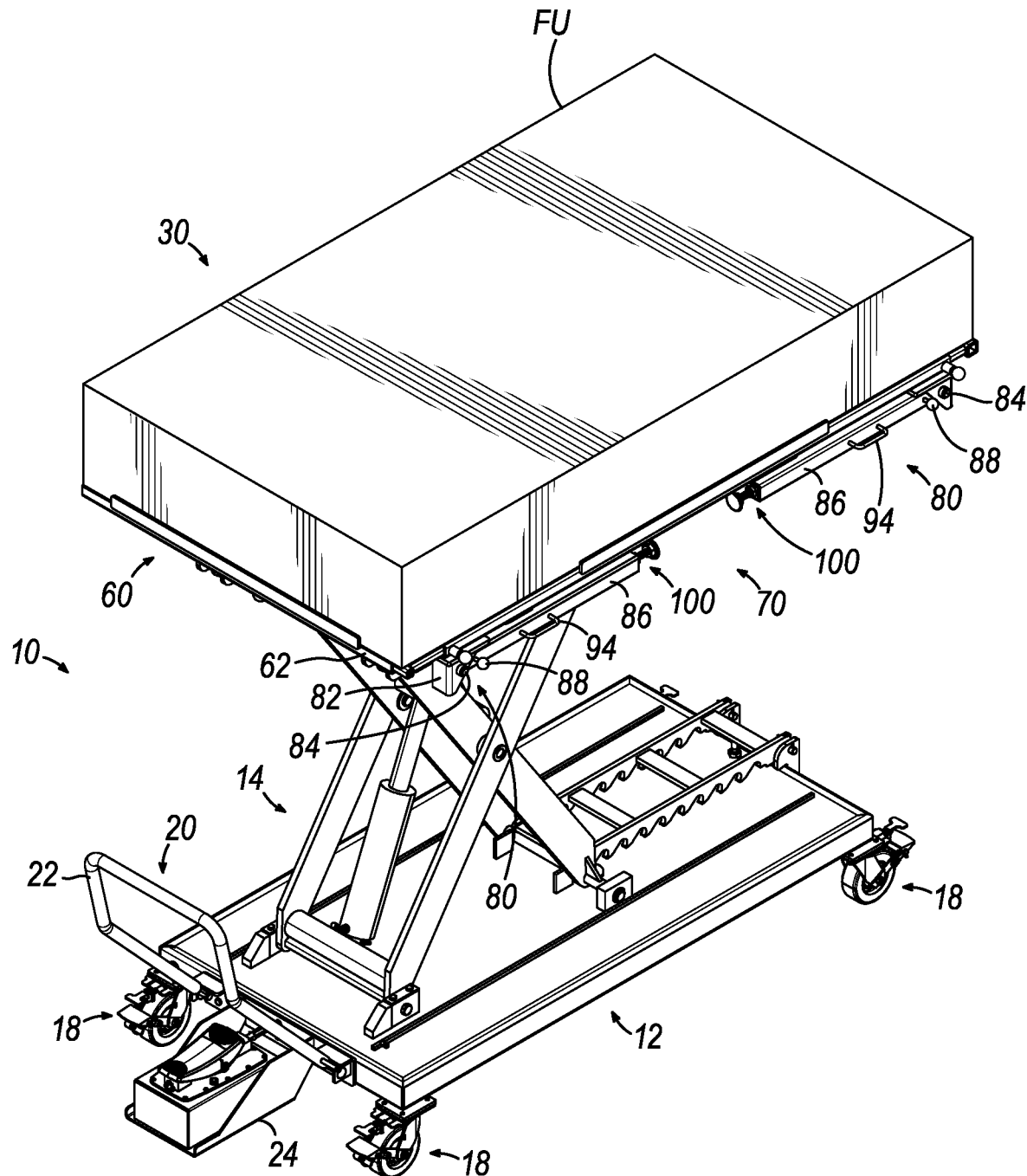
FIG. 3C is a top perspective view of the detachable support structure of FIG. 1A operatively attached with the lift table of FIG. 3A in a raised configuration, where the retractable leg assembly of FIG. 1A is in the retracted configuration, and where the detachable support structure and the lift table are operatively supporting a fuel unit.

Next, as shown in FIG. 3C, a technician may suitably position lift table (10) and support structure (30) in preparation for receiving a fuel unit (FU). Fuel unit (FU) may have been recently detached from an EV that is elevated on a vehicle lift. In such aspects of the disclosure, a technician may elevate lift table (10) and support structure (30) such that support structure (30) is engaged with fuel unit (FU) or almost in direct engagement with fuel unit (FU) while coupled to the elevated EV. Next, the technician may suitably remove fuel unit (FU) from the EV such that fuel unit (FU) is suitably received and supported by support structure (30) and lift table (10). As mentioned above, support structure (30) includes retainment tabs (64, 74) configured to engage a peripheral of fuel unit (FU), which may further promote support structure (30) remaining suitably engaged with fuel unit (FU).

Figure 3D:
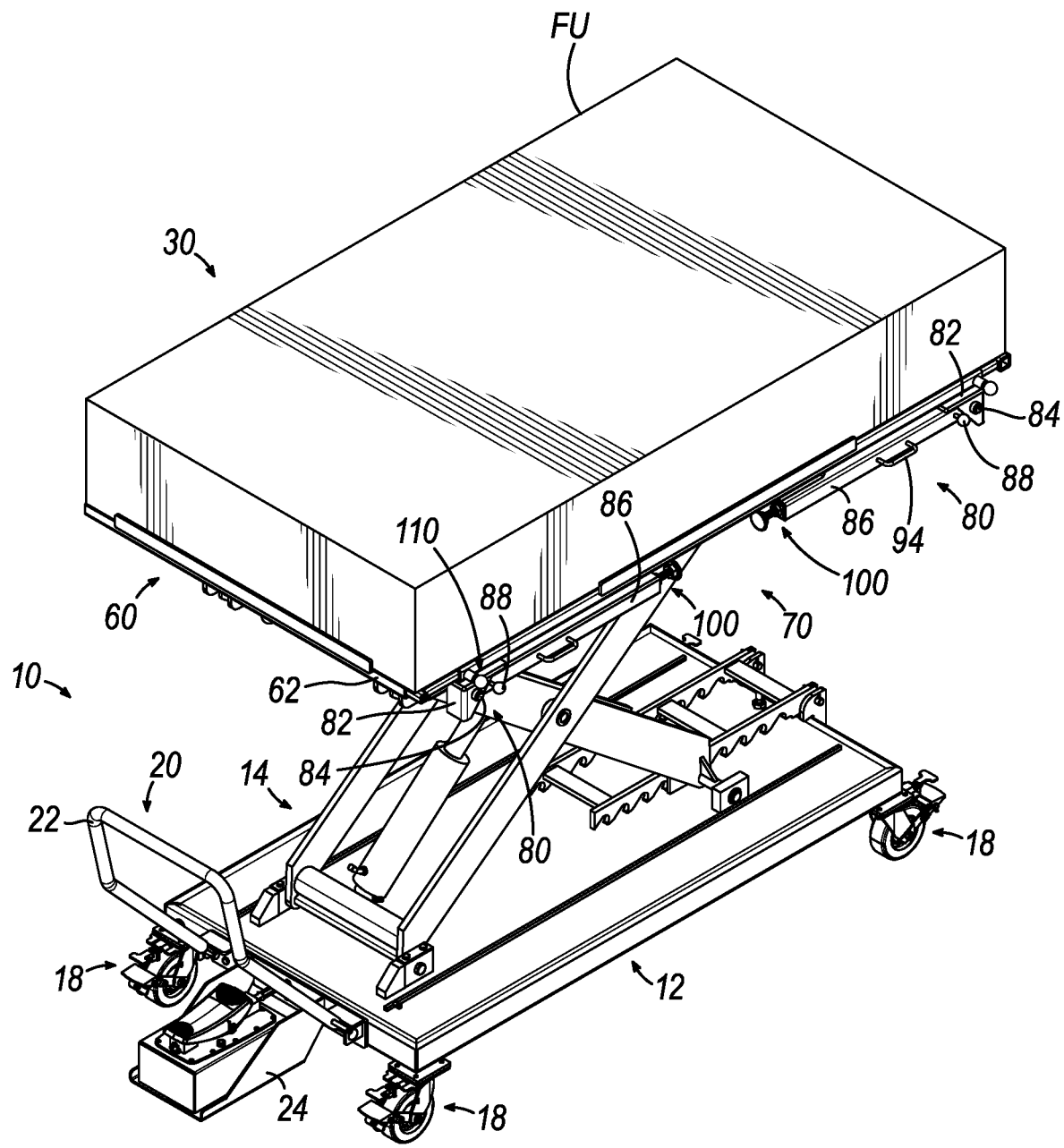
FIG. 3D is a top perspective view of the detachable support structure of FIG. 1A operatively attached with the lift table of FIG. 3A in a partially lowered configuration, where the retractable leg assembly of FIG. 1A is in the retracted configuration, and where the detachable support structure and the lift table are operatively supporting a fuel unit.

Next, as shown in FIG. 3D, with fuel unit (FU) operatively supported on support structure (30) and lift table (10), a technician may lower lift table (10) in accordance with the description herein and transport fuel unit (FU) to a desired location utilizing lift table (10) and support structure (30). In some instances, the technician may lower lift table (10) to the completely lowered position while transporting fuel unit (FU). In other instances, the technician may only partially lower fuel unit (FU) during transportation. Yet in other instances, the technician may keep fuel unit (FU) in the raised position during transportation.

Figure 3E:
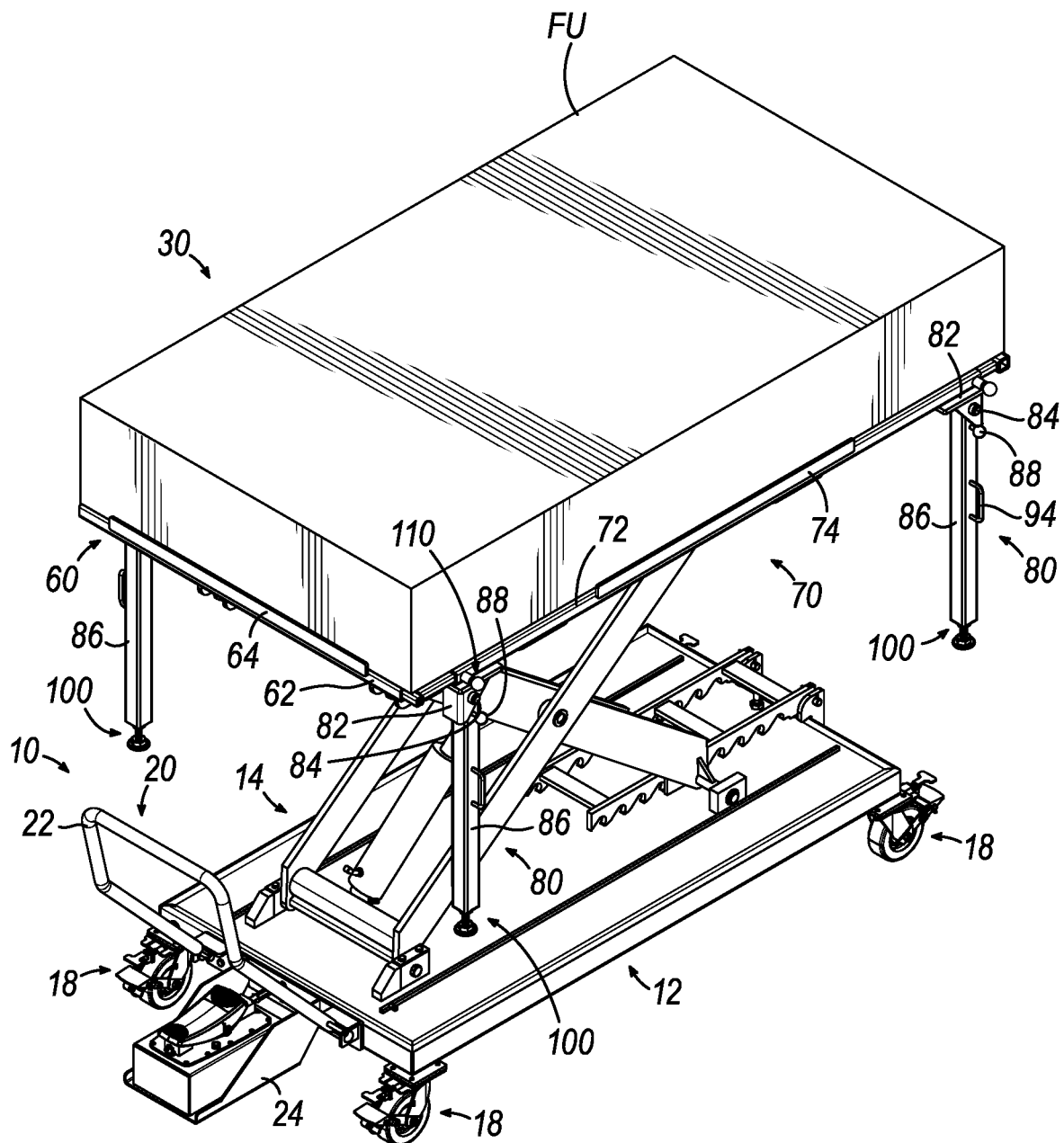
FIG. 3E is a top perspective view of the detachable support structure of FIG. 1A operatively attached with the lift table of FIG. 3A in a partially lowered configuration, where the retractable leg assembly of FIG. 1A is in the downward configuration, and where the detachable support structure and the lift table are operatively supporting a fuel unit.

Next, as shown in FIG. 3E, with fuel unit (FU) moved to the desired location, a technician may then move legs (86) from the retracted position into the downward position in accordance with the description herein. Therefore, legs (86) may be locked in the downward position and ready to suitably engage a floor. At the moment shown in FIG. 3E, the technician may also remove coupling pins (32) from each bracket (26) such that support structure (30) is no longer substantially fixed relative to tabletop assembly (16).

Figure 3F:
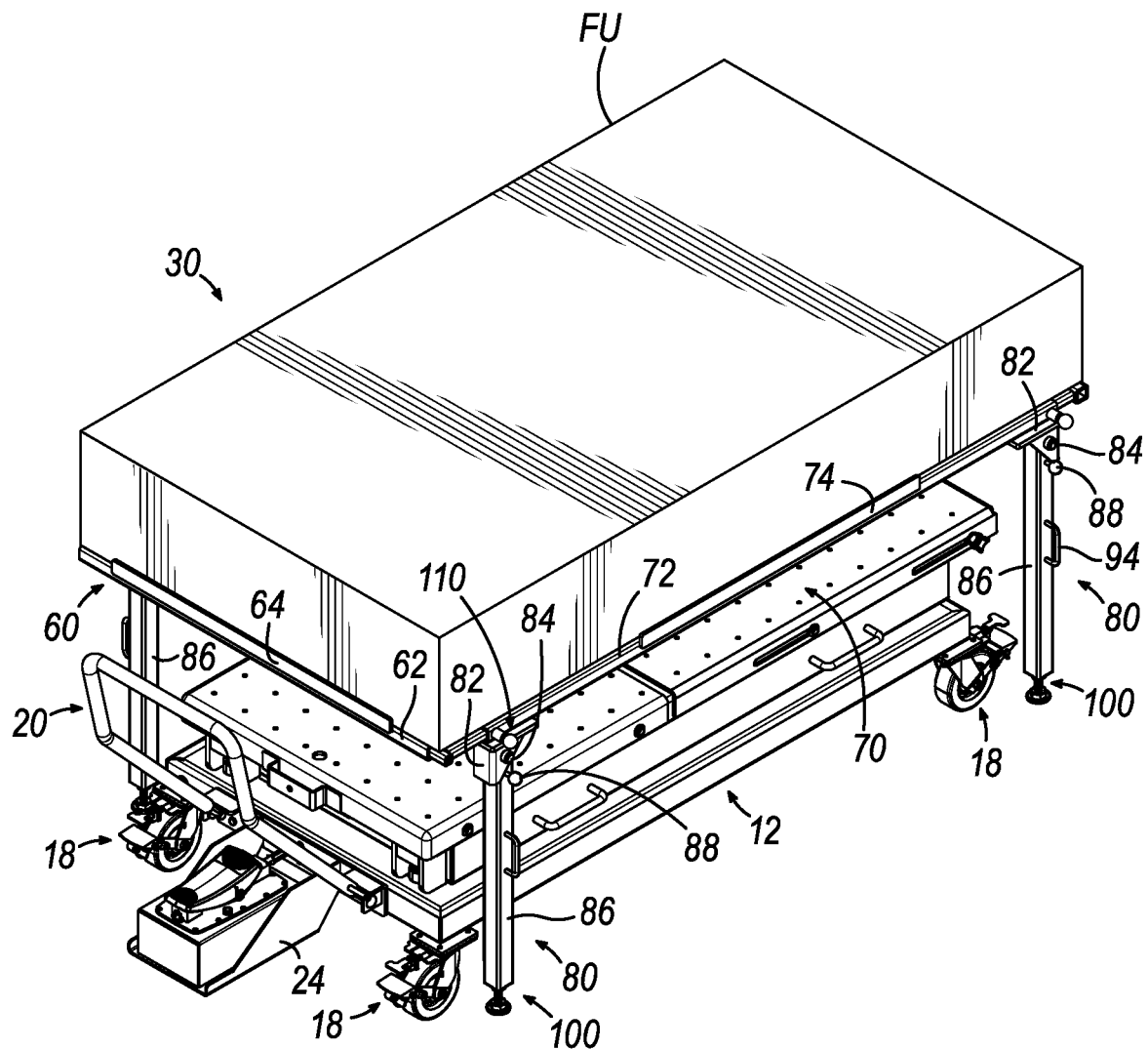
FIG. 3F is a top perspective view of the detachable support structure of FIG. 1A detached with the lift table of FIG. 3A in a lowered configuration, where the retractable leg assembly of FIG. 1A is in the downward configuration, and where the detachable support structure is operatively supporting a fuel unit.

Next, as shown in FIG. 3F, the technician may lower tabletop assembly (16) of lift table (10) until legs (86) engage floor (F). As also shown in FIG. 3F, the technician may lower tabletop assembly (16) all the way to the lowered position such that top surfaces (15) are no longer in engagement with adjustable engagement frame assembly (40). The technician may utilize adjustable leveling pads (100) in order to ensure legs (86) suitably engage floor (F). With legs (86) engaging floor (F), support structure (30) may be keeping fuel unit (FU) elevated on floor (F). Therefore, as shown in FIG. 3G, with support structure (30) keeping fuel unit (FU) elevated without the help of lift table (10), lift table (10) may be removed and used elsewhere.

Figure 3G:
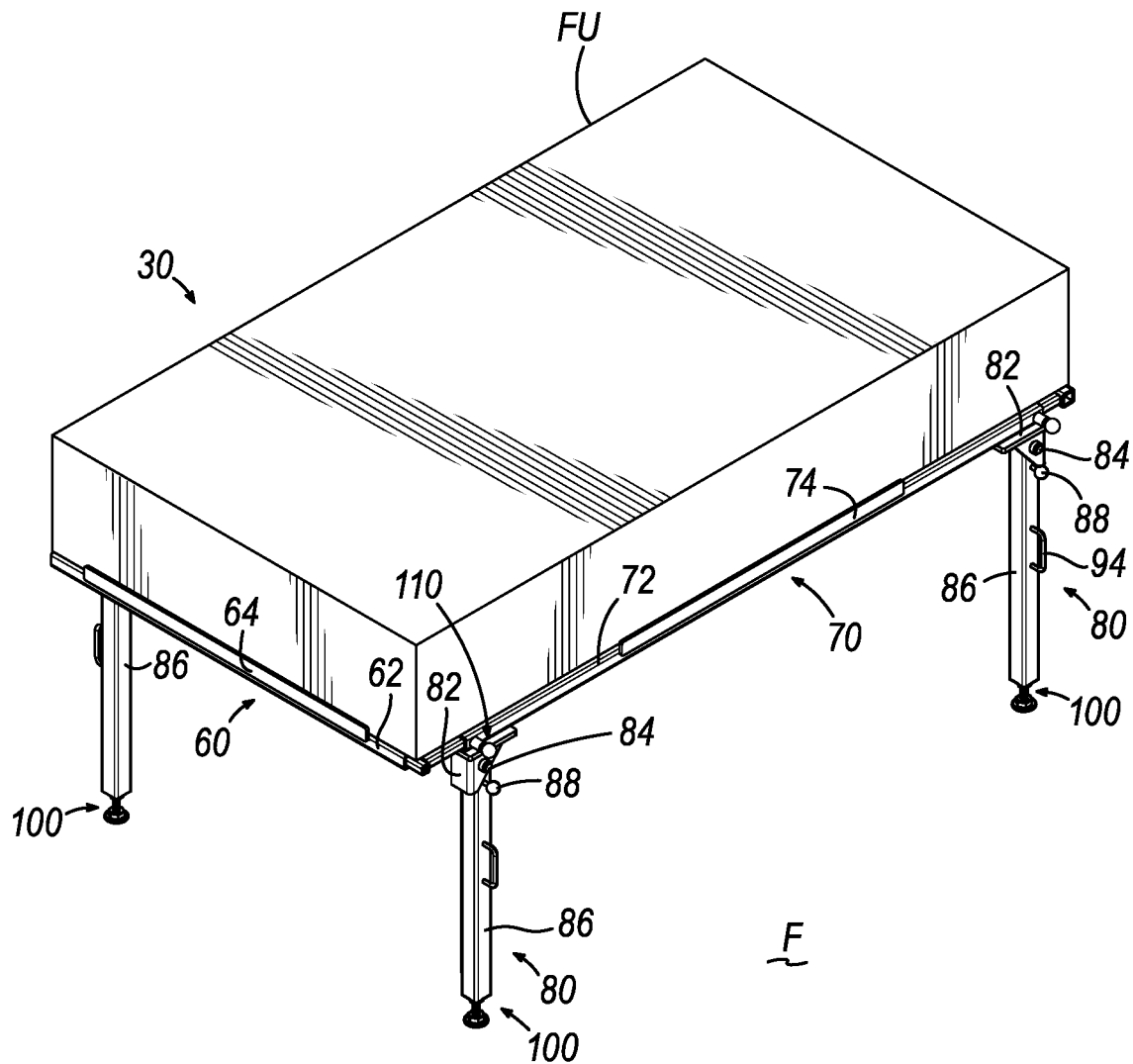
FIG. 3G is a top perspective view of the detachable support structure of FIG. 1A, where the retractable leg assembly of FIG. 1A is in the downward configuration, where the detachable support structure is operatively supporting the fuel unit.

With fuel unit (FU) elevated by support structure (30) as shown in FIG. 3G, technicians may easily access fuel unit (FU) for various reasons as would be apparent to one skilled in the art in view of the teachings herein. For example, a technician may access the top portion of fuel unit (FU) easily without having to kneel down, bend over, or use some other undesirable anatomical position. As another example, in instances where windows defined by adjustable engagement frame assembly (40) remain exposed (or at least partially exposed), a technician may access the underside of fuel unit (FU) facing floor (F).

Additionally, in some instances, it may be desirable to further transport fuel unit (FU) utilizing table (10) after being placed in the position shown in FIG. 3G. If further transportation is desired, a technician may simply move the same or another lift table (10), while in the lowered position, under support structure (30) as shown in FIG. 3F. The technician may suitably align downward tabs (50) of support structure (30) with brackets (26) such that raising lift table (10) initially engages the underside of frame assembly (40) and allows tabs (50) to be inserted within slots (25) defined by brackets (26). The technician may then further align tabs (50) and brackets (26) such that coupling holes (28, 52) are suitably aligned, and then insert coupling pins (32) to reaffix tabletop assembly (16) to support structure (30). Next, the technician may then further elevate support structure (30) and fuel unit (FU) via mobile table (10) such that legs (86) no longer engage floor (F), as shown in FIG. 3E. Once legs (86) no longer engage floor (F), the technician may then move legs (86) to the retracted position in accordance with the description herein and as shown in FIG. 3D. If desired, the technician may then lower fuel unit (FU), support structure (30), and tabletop assembly (16) for purposes of further transporting fuel unit (FU). Therefore, support structure (30) provides an easy and convenient way for a technician to re-engage a fuel unit (FU) in storage with a lift table (10).

In some instances, frame assembly (40) may come with mounting brackets configured to receive threaded bolts to affix frame assembly (40) to top surfaces (15) of tabletop assembly (16). In some such instances, once mobile table (10) and support structure (30) are suitably engaging a fuel unit (FU) in accordance with the description herein, frame assembly (40) may not be configured to detach from top surfaces (15). In such instances, tabletop assembly (16) may be lowered while legs (86) are in the downward position such that legs (86) engage floor (F) in order to further promote support and stability of mobile lift table (10) while supporting fuel unit (FU).

II. Exemplary Combinations

The following non-exhaustive examples relate to various ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to be critical or to have been added for any reason relating to patentability.

Example 1 is a method of receiving, transporting, and storing a fuel unit, the method comprising the steps of positioning a support structure on a tabletop assembly of a mobile lift table and under an elevated vehicle having the fuel unit; removing the fuel unit from the elevated vehicle such that the support structure receives the fuel unit; moving the fuel unit away from the elevated vehicle; removing the support structure from the tabletop assembly of mobile lift table; and lowering the tabletop assembly of the mobile lift table such that a plurality of legs of the support structure engage a floor.

Example 2 is the method of Example 1, further comprising further lowering the tabletop assembly of the mobile lift table such that the tabletop assembly is no longer supporting the support structure or the fuel unit.

Example 3 is the method of any one or more of the preceding Examples, further comprising, before the positioning step, attaching the support structure to the tabletop assembly; and before the removing step, detaching the support structure from the tabletop assembly.

Example 4 is the method of Example 3, wherein attaching the support structure to the tabletop assembly further comprises inserting a tab of the support structure into a slot defined by a bracket of the tabletop assembly.

Example 5 is the method of Example 4, wherein the tab and bracket each define a coupling hole, wherein attaching the support structure to the tabletop assembly further comprises inserting a coupling pin within both coupling holes of the tab and the bracket.

Example 6 is the method of any one or more of Examples 3-5, further comprising adjusting a size of an engagement frame assembly of the support structure; and further lowering the tabletop assembly of the mobile lift table such that the tabletop assembly is no longer supporting the support structure or the fuel unit; wherein the adjusting step occurs after the detaching step but before the further lowering step.

Example 7 is the method of any one or more of the preceding Examples, wherein each of the plurality of legs comprises a locking device configured to selectively lock the leg in either a retracted position or a downward position, and further comprising the step of engaging the locking device in the downward position before the lowering step.

Example 8 is the method of any one or more of the preceding Examples, further comprising actuating the plurality of legs from a retracted position into a downward position.

Example 9 is the method of Example 8, wherein actuating the plurality of legs comprises pivoting each of the plurality of legs.

Example 10 is the method of any of the preceding Examples, further comprising adjusting a size of an engagement frame assembly of the support structure.

Example 11 is the method of Example 10, wherein the engagement frame assembly comprises at least one retainment tab, further comprising engaging the at least one retainment tab with a peripheral of the fuel unit.

Example 12 is a method of lifting a fuel unit towards a vehicle, the method comprising the steps of supporting the fuel unit with a support structure having a plurality of legs, each leg of the plurality of legs being in an extended configuration; removably attaching the support structure to a tabletop assembly of a mobile table; lifting the tabletop assembly to thereby lift the mobile lift table and the fuel unit towards the vehicle; transitioning each leg of the plurality of legs between the extended configuration and a retracted configuration, wherein the extended configuration is configured to allow a foot of a respective leg to contact a floor, and wherein the retracted configuration is configured to prevent the foot of the respective leg from contacting the floor.

Example 13 is the method of Example 12, wherein transitioning each leg of the plurality of legs between the extended configuration and the retracted configuration includes selectively locking each leg into either the extended configuration or the retracted configuration.

Example 14 is the method of Example 12, further comprising attaching the fuel unit to the vehicle once the fuel unit has been lifted towards the vehicle.

Example 15 is the method of Example 14, further comprising separating the fuel unit from the support structure once the fuel unit has been attached to the vehicle.

Example 16 is an apparatus for supporting a fuel unit, the apparatus comprising a frame including an attachment portion and a coupling portion, the attachment portion being configured to engage the fuel unit to thereby prevent lateral movement of the fuel unit relative to the frame, the coupling portion being configured to engage a lift table to thereby prevent lateral movement of the frame relative to the lift table; and a plurality of legs movably attached to the frame, each leg of the plurality of legs being configured to transition between an extended configuration and a retracted configuration, wherein the extended configuration is configured to allow a foot of a respective leg to contact a floor, wherein the retracted configuration is configured to prevent the foot of the respective leg from contacting the floor.

Example 17 is the apparatus of Example 16, wherein the frame is configured to extend between a first length and a second length, the first length being longer than the second length.

Example 18 is the apparatus of Example 17, wherein the frame is configured to extend between a first width and a second width, the first width being wider than the second width.

Example 19 is the apparatus of Example 18, wherein the frame includes at least one locking device, the at least one locking device being configured to selectively lock the frame in either the first length, the second length, the first width, or the second width.

Example 20 is the apparatus of any one or more of Examples 16 through 19, wherein the attachment portion includes a series of upwardly projecting tabs, the series of upwardly projecting tabs being configured to engage a peripheral of the fuel unit.

Example 21 is the apparatus of any one or more of Examples 16 through 20, wherein each leg of the plurality of legs is configured to selectively lock into either the extended or retracted configurations.

Example 22 is the apparatus of Example 21, each leg of the plurality of legs being pivotally coupled to a respective bracket fixedly secured to the frame.

Example 23 is the apparatus of any one or more of Examples 16 through 22, the frame being configured to maintain a fixed length between a bracket and an adjacent bracket during an extension of the frame, the frame being further configured to vary a width between the bracket and another adjacent bracket during a widening of the frame.

III. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. An apparatus for supporting a fuel unit, the apparatus comprising:
   (a) a frame including an attachment portion and a coupling portion, wherein the attachment portion comprises at least one retainment tab extending upwardly from a respective portion of the frame, wherein the coupling portion comprises at least one tab extending downwardly from a respective portion of the frame, the at least one retainment tab being configured to engage a perimeter of the fuel unit to thereby prevent lateral movement of the fuel unit relative to the frame, the coupling portion being configured to engage and detachably couple, by the at least one tab and a coupling pin, to a bracket of a lift table to prevent lateral movement of the frame relative to the lift table; and (b) a plurality of legs movably attached to the frame, each leg of the plurality of legs being configured to transition between an extended configuration and a retracted configuration, wherein the extended configuration is configured to allow a foot of a respective leg to contact a floor, wherein the retracted configuration is configured to prevent the foot of the respective leg from contacting the floor.

2. The apparatus of claim 1, wherein the frame is configured to extend between a first length and a second length, the first length being longer than the second length.

3. The apparatus of claim 2, wherein the frame is configured to extend between a first width and a second width, the first width being wider than the second width.

4. The apparatus of claim 3, wherein the frame includes at least one locking device, the at least one locking device being configured to selectively lock the frame in either the first length, the second length, the first width, or the second width.

5. The apparatus of claim 1, wherein the at least one retainment tab includes a series of upwardly projecting tabs, the series of upwardly projecting tabs being configured to engage the perimeter of the fuel unit.

6. The apparatus of claim 1, wherein each leg of the plurality of legs is configured to selectively lock into either the extended or retracted configurations.

7. The apparatus of claim 6, each leg of the plurality of legs being pivotably coupled to a respective bracket fixedly secured to the frame.

8. The apparatus of claim 1, the frame being configured to maintain a fixed length between a bracket and an adjacent bracket during an extension of the frame, the frame being further configured to vary a width between the bracket and another adjacent bracket during a widening of the frame.

9. An apparatus for supporting a fuel unit, the apparatus comprising:
(a) a frame dimensioned to receive a fuel unit to thereby support the fuel unit and inhibit movement of the fuel unit relative to the frame, wherein at least one laterally slidable section of at least one adjustable end section of the frame comprises a retainment tab configured to engage a perimeter of the fuel unit to thereby prevent lateral movement of the fuel unit relative to the frame, wherein the frame is configured to selectively attach and detach to a tabletop assembly of a mobile lift table while the frame supports the fuel unit; and
(b) a plurality of support legs attached to the frame, wherein each support leg of the plurality of support legs is configured to move relative to the frame between an extended position and a retracted position, wherein the plurality of legs extend away from the frame in the extended position such that the plurality of legs are configured to contact a floor to thereby support both the frame and a supported fuel unit while the frame is detached from the tabletop assembly of the mobile lift table.

10. The apparatus of claim 9, wherein each support leg of the plurality of support legs is pivotally attached to the frame.

11. The apparatus of claim 10, further comprising a locking assembly configured to selectively lock each support leg of the plurality of support legs in the retracted position.

12. The apparatus of claim 11, wherein the locking assembly is configured to selectively lock each support leg of the plurality of support legs in the extended position.

13. The apparatus of claim 11, wherein the locking assembly comprises a plurality of spring-biased pins, wherein each spring-biased pin of the plurality of spring-biased pins are slidably housed within a respective support leg of the plurality of support legs.

14. The apparatus of claim 13, wherein the locking assembly comprises a plurality of plates, wherein each plate of the plurality of plates is fixed relative to a respective portion of the frame, wherein the plate defines a locking slot, wherein the locking slot of a respective plate is dimensioned to receive a respective locking pin to thereby lock the respective support leg in the retracted position.

15. The apparatus of claim 9, wherein each support leg of the plurality of support legs comprises an adjustable leveling pad configured to adjust a length of a respective support length.

16. The apparatus of claim 15, wherein each adjustable leveling pad comprises a threaded rod.

17. An apparatus for supporting a fuel unit, the apparatus comprising:
(a) a frame dimensioned to receive a fuel unit to thereby support the fuel unit and inhibit movement of the fuel unit relative to the frame, wherein at least one laterally slidable section of at least one adjustable side section of the frame comprises a retainment tab configured to engage a perimeter of the fuel unit to thereby prevent lateral movement of the fuel unit relative to the frame, wherein the frame is configured to selectively attach and detach to a tabletop assembly of a mobile lift table while the frame supports the fuel unit; and
(b) at least one support leg pivotally attached to the frame, wherein the at least one support leg is configured to pivot relative to the frame between an extended position and a retracted position, wherein the at least one support leg extends away from the frame in the extended position such that the at least one support leg is configured to contact a floor to support the frame while the frame is both detached from the tabletop assembly of the mobile lift table and supporting the fuel unit.

18. The apparatus of claim 17, wherein the at least one support leg comprises a handle.

19. The apparatus of claim 17, wherein the at least one support leg comprises lock configured to secure the at least one support leg in the retracted position.

20. The apparatus of claim 19, wherein the lock is configured to secure the at least one support leg in the extended position.

* * * * *